March 10, 1964
J. E. GORGENS
3,124,003
PORTABLE TEST THERMOMETER
Filed March 15, 1961
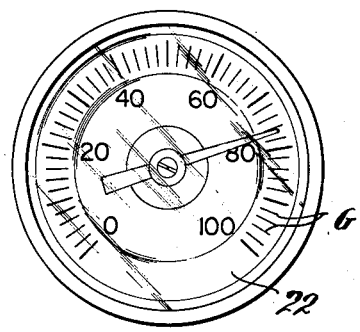
FIG. 2
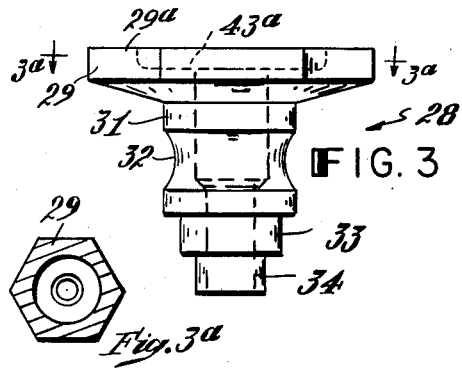
FIG. 3
FIG. 4
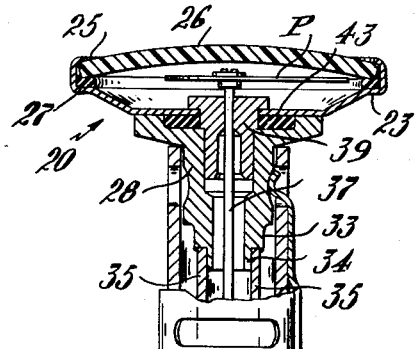
FIG. 1
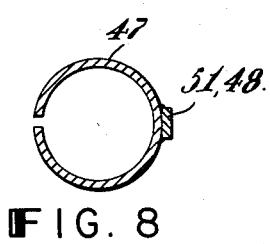
FIG. 8
FIG. 5
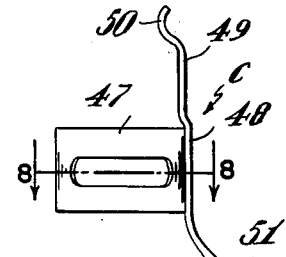
FIG. 7
FIG. 9
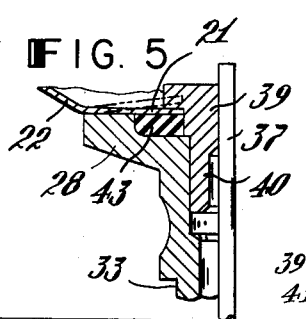
FIG. 6
INVENTOR.
Joseph E. Gorgens
BY
ATTORNEY.

United States Patent Office 3,124,003
Patented Mar. 10, 1964

3,124,003
PORTABLE TEST THERMOMETER
Joseph E. Gorgens, Easton, Conn., assignor to Manning, Maxwell & Moore, Incorporated, Stratford, Conn., a corporation of New Jersey
Filed Mar. 15, 1961, Ser. No. 95,860
5 Claims. (Cl. 73—363.9)

This invention pertains to dial thermometers, for example, of that type wherein an index or pointer is fixed to a rotary staff which is turned, in accordance with temperature variations, by the action of a thermal motor, for example, a bimetallic coil, and relates more especially to a test thermometer of so small dimensions that it may readily be carried about by placing it in the user's pocket. Among the objects of the invention are to provide a thermometer of the above type which is simple and inexpensive to construct; which is light in weight; which is so designed that it may readily be recalibrated without taking it apart; and wherein the dial housing is removably attached to a portable protective case for the thermometer stem by means of a single spring clip which also serves to attach the case and thermometer to the wearer's clothing.

Other and further objects and advantages of the invention will be pointed out in the following more detailed description and by reference to the accompanying drawings wherein:

FIG. 1 is a side elevation showing the dial housing and adjacent parts in diametrical section and with a portion of the protective case broken away to show the lower part of the thermometer stem;

FIG. 2 is a plan view of the instrument shown in FIG. 1;

FIG. 3 is a side elevation, to larger scale, of an adapter, by means of which the dial housing is connected (with provision for relative rotation) to the thermometer stem, and which also constitutes an element by means of which the protective case and the thermometer are connected;

FIG. 3a is a section, to smaller scale, on the line 3a—3a of FIG. 3;

FIG. 4 is a diametrical section showing the base member of the dial housing as it appears before it is assembled with the other parts;

FIG. 5 is a fragmentary radial section showing the base member of the dial housing, the adapter, the upper staff bearing and an interposed washer, and showing the shape of the lower wall of the dial housing after the parts have been assembled;

FIG. 6 is a fragmentary diametrical view, to larger scale than FIG. 1, showing the upper part of the protective case;

FIG. 7 is a side elevation of a clip by means of which the case is secured to the adapter, and by means of which the case may be clipped to a part of the user's clothing, for example to the front wall of a coat pocket;

FIG. 8 is a section on the line 8—8 of FIG. 7; and

FIG. 9 is a diametrical section, showing a plug which provides the upper bearing for the pointer staff and which also connects the dial housing with the thermometer stem.

Referring to the drawings, the numeral 20 designates the base member of the dial housing, here shown (FIGS. 1 and 4) as of sheet metal, having an annular bottom wall 21 which, as shown in FIG. 4, initially has a slight, upward conical slope and whose edge merges with an upwardly flaring wall 22 which, in turn, merges with a horizontal shoulder 23, the latter being integral with a bead or flange portion 24. The upper edge 25 (FIG. 1) of this bead, in the completed instrument overlies the margin of the transparent panel 26. The edge of this panel rests upon a resilient gasket 27 supported by the horizontal shoulder 23 of the housing 20. The crimping of the edge 25 over the margin of the panel 26 provides a permanent connection between the base 20 of the housing and the panel 26 and, at the same time, compresses the gasket 27 to make the housing leak-tight.

An adapter 28 (FIGS. 1, 3 and 5), which may be of metal or plastic, comprises an upper part 29, having a flat top surface 29a upon which the lower wall 21 of the base 20 of the dial housing rests. Desirably, the upper part 29 of the adapter is hexagonal (as shown in FIG. 3a), for the reception of a wrench, by means of which the adapter 28 may be held stationary during the calibration of the device, as hereinafter described. The adapter 28 also comprises the generally cylindrical part 31, having a central groove 32, here shown as having a concave inner surface, the part 31, as shown, being integrally joined, at its lower end, with a cylindrical part 33 of somewhat smaller diameter which, in turn, is integrally joined with a part 34 of still smaller diameter. The part 34 fits snugly within the upper end of the stem tube 35 which may be of any desirable heat-conducting material, but preferably metal, and which is closed at its lower end by a cap 36. Within the lower part of this stem tube there is arranged a conventional bimetallic coil B, whose lower end is secured to the closure cap 36 and whose upper end is connected to the rotary staff 37, which extends upwardly through the stem tube into the dial housing and has the index or pointer P fixed to its upper end. Just below the pointer the staff 37 finds a bearing in a plug 39 (FIGS. 1, 5 and 9), comprising a lower cylindrical portion 40 which, in assembling the parts, is forced into the upper part of a central bore in the adapter 28 with a press-fit. The plug 39 has a shoulder 41 which limits its downward movement into the adapter and another shoulder 42 which bears against the upper surface of the bottom wall 21 of the dial housing when the parts are assembled. In assembling the parts, a resilient washer or bushing 43 is placed upon the surface 43a of the adapter, the bottom member 20 of the dial housing is then placed upon this bushing and the plug 39 is pressed into place. As the plug is forced downwardly, the shoulder 42 engages the inner edge of the bottom wall 21 of the member 20, and forces said bottom wall down from the broken line position of FIG. 5, until it is substantially horizontal, thus placing the material of the base member 20 under bending stress and, at the same time, compressing the washer 43. Because of the yielding character of the washer, and of the deformation of the lower wall 21 in the assembly operation, as just above described, the base member 20, while firmly secured to the adapter, and in a leak-tight manner, may, nevertheless, be turned relatively to the adapter by the application of sufficient force. In so turning the base member 20 relatively to the adapter, a wrench will be engaged with the hexagonal part 29 of the adapter so as to hold the latter stationary while force is applied to the bead member 24 of the dial housing to turn the latter relatively to the adapter.

For protecting the stem tube 34, a carrying case K (FIG. 1) is provided, here shown as generally cylindrical, but having a smoothly curved lower end. Such a tubular carrier may be produced from plastic or metal by an extrusion process, or otherwise as desired. Its upper edge 44 forms a stop for contact with the adapter 28 as the stem of the instrument is introduced into the case K. Near its upper end, the case K is provided with one or more holes 45, so located as to be opposite to the groove 32 of the adapter when the parts are assembled. For holding the thermometer in assembled relation to the carrying case K, there is provided a clip C (FIG. 7), which comprises the split resilient band 47 designed to embrace the case K with a firm grip. The clip also comprises the upwardly extending resilient arm 49 which is welded or otherwise permanently secured to the ring 47 and which, at its upper end, has the curved latch portion 50 which is designed to pass through one of the openings 45 in the carrying case and to engage the inner surface of the groove 32 of the adapter. The clip also has the downwardly directed resilient arm 51, having the smoothly curved portion 52, which is designed to engage the outer surface of the wall of the pocket of a garment, the carrying case K having been disposed within the pocket, so that the front wall of the pocket is resiliently clamped between the parts K and 52. Desirably, the lower end of the arm 51 is provided with a spherical ball 53, or other finish, to provide a handle by means of which the clip may be manipulated, and also to prevent damage to a garment with which the device is used.

As illustrated, the inner surface of the sloping wall 22 of the base 20 of the dial housing is provided with graduation marks G (FIG. 2), while the designating numerals are placed upon the upper surface of the bottom wall 21 of the housing, the lower wall of the housing thus, itself, constituting the dial.

By reason of the above construction, it is unnecessary to provide a separate bezel ring for holding the transparent panel in place, nor is it necessary to take the instrument apart in order to recalibrate it, since it is only necessary, as above described, to hold the adapter 28 stationary while rotating the dial housing relatively to the adapter, which may be done by gripping the housing in the hand and applying the necessary turning force, the frictional resistance to turning being sufficient to retain the parts in position after adjustment. It is thus possible to calibrate the instrument by immersing the stem tube in a liquid of exactly determined temperature and then turning the dial housing relatively to the adapter until the pointer corresponds to the proper graduation. After having thus calibrated the instrument, the dial housing will remain indefinitely in the new position, because of the pressure between the bottom wall 21 of the dial housing and the upper surface of the adapter resultant from the deformation of the wall 21 in assembling the parts. This simple construction makes it unnecessary to provide a separate dial since the graduations, as above noted, can be printed directly upon the upper surface of the part 20. Moreover, because of the manner in which the clip C retains the adapter in assembled relation with the carrying case, it is not necessary to provide interengaging screw threads on these parts, such screw threads would not be wholly satisfactory when, for example, one or both of said parts is made of plastic or other soft material. Moreover, the threading of the parts is more expensive than the arrangement herein disclosed.

While one desirable embodiment of the invention has herein been disclosed by way of example, it is to be understood that the invention is broadly inclusive of any and all modifications, either as to structure, or materials employed, which fall within the terms of the appended claims.

I claim:

1. In a dial thermometer including a dial housing and a tubular stem housing a thermally-responsive motor, the dial housing including graduations fixed relative thereto, a pointer shaft connected to said motor and extending into said dial housing and having a pointer mounted thereon for movement therewith relative to the dial housing, means mounting said dial housing on the stem, and resiliently deformable means on the dial housing in cooperating engagement with said means mounting said dial housing to provide frictional resistance to angular adjustment of said dial housing relative to said stem whereby the dial housing and thus said graduations may be angularly adjusted relative to said pointer shaft without disassembly of the thermometer.

2. In a dial thermometer as described in claim 1, the dial housing including a resilient bottom wall portion which is generally annular and which is deformed from a generally frusto-conical configuration to a substantially flat annular configuration when assembled with said means mounting said dial housing on the stem.

3. In a dial thermometer as described in claim 2, said means mounting the dial housing on the stem being an adapter having a bore receiving the pointer shaft and having an end pointer fixed to said stem, the other end of said adapter slidably bearing on said bottom wall portion of the dial housing, and a plug engaged in said bore and having a shoulder bearing on the side of said bottom wall portion opposite said adapter to maintain said bottom wall portion of the dial housing in assembly with said adapter and in its deformed configuration.

4. A dial thermometer of the kind wherein a pointer is fixed to the end of a rotary staff and a thermally-responsive motor turns the staff in response to temperature variations, said thermometer having a housing providing a chamber within which the pointer is located, said housing comprising a unitary base having an annular, substantially flat, resilient metal bottom wall portion, graduations fixed relative to said wall portion, a transparent panel constituting a top for the housing, a tubular stem housing said motor which comprises a bimetallic coil an end of which is fixed to the stem and the other end of which is fixed to said staff, and means connecting the housing and stem including an adapter having a bore which is coaxial with the stem, one end of the adapter being fixed to the stem, the other end of the adapter slidably contacting the under surface of said bottom wall portion, and a plug press-fit into the bore of the adapter and having a flange slidably contacting said bottom wall portion whereby the housing and stem are permanently united, but relatively rotatable about the axis of said staff, said bottom wall portion prior to assembly with the adapter having a slight conical slope but being held substantially flat and under bending stress by the flange of the plug thereby exerting friction pressure on the adapter such as to resist relative rotation of the adapter and housing.

5. A dial thermometer of the kind wherein a pointer, fixed to a rotary staff, cooperates with a graduated dial to indicate variations in temperature, said thermometer comprising a dial housing having a unitary base whose bottom wall is annular and an upwardly sloping side wall which merges with a horizontal shoulder, a resilient gasket resting upon said shoulder, and a transparent panel whose margin rests upon said gasket, the upper edge of the base overlapping the margin of the transparent panel and permanently holding the latter in leak-tight engagement with the gasket, a tubular stem having a thermally-responsive motor therein, a rotatable staff actuatable by the thermally-responsive motor, and means for connecting the stem to the dial housing comprising an adapter having, at one end, an annular surface which contacts the lower face of the bottom wall of the dial housing, and whose opposite end is fixed to said tubular stem, means whereby the lower wall of the dial housing is secured leak-tight, but with provision for relative rotation to the adapter, a protective case providing a chamber for the reception of the tubular stem, said case having an opening in its wall, the adapter having a peripheral groove which is opposed to said opening when the parts are assembled, and a spring clip comprising a split band which embraces and grips the case, a resilient arm fixed to said band and having a latch element at its end which normally reaches through the opening in the carrying case and into the groove in the adapter, and a second spring arm operative to clamp the carrying case to the garment of a user.

References Cited in the file of this patent

UNITED STATES PATENTS

| | | |
|---|---|---|
| 1,058,199 | Schneider | Apr. 8, 1913 |
| 1,270,914 | Zimoars | July 2, 1918 |
| 1,344,897 | Johnson | June 29, 1920 |
| 2,343,372 | Ford et al. | Mar. 7, 1944 |
| 2,471,704 | Rose et al. | May 31, 1949 |
| 2,638,785 | Vacanti et al. | May 19, 1953 |
| 2,743,613 | Kebbon | May 1, 1956 |

FOREIGN PATENTS

| | | |
|---|---|---|
| 416,484 | Great Britain | Sept. 17, 1934 |